US010736275B2

(12) United States Patent
Lopez

(10) Patent No.: US 10,736,275 B2
(45) Date of Patent: Aug. 11, 2020

(54) MODULAR, MOVABLE, VERSATILE, VERTICAL GREENHOUSE

(71) Applicant: Juan Ramon Lopez, Montreal (CA)

(72) Inventor: Juan Ramon Lopez, Montreal (CA)

(*) Notice: Subject to any disclaimer, the term of this patent is extended or adjusted under 35 U.S.C. 154(b) by 76 days.

(21) Appl. No.: 16/137,507

(22) Filed: Sep. 20, 2018

(65) Prior Publication Data

US 2019/0082618 A1 Mar. 21, 2019

(30) Foreign Application Priority Data

Sep. 20, 2017 (GB) .................................. 1715204.2

(51) Int. Cl.
*A01G 9/02* (2018.01)
*A01G 9/14* (2006.01)
*A01G 9/24* (2006.01)
*A01G 9/16* (2006.01)
*A01G 9/20* (2006.01)
*A01G 31/06* (2006.01)
*A01G 9/22* (2006.01)

(52) U.S. Cl.
CPC .......... *A01G 9/1423* (2013.01); *A01G 9/023* (2013.01); *A01G 9/16* (2013.01); *A01G 9/20* (2013.01); *A01G 9/22* (2013.01); *A01G 9/24* (2013.01); *A01G 9/247* (2013.01); *A01G 31/06* (2013.01)

(58) Field of Classification Search
CPC ........ A01G 9/1423; A01G 9/023; A01G 9/16; A01G 9/20; A01G 9/22; A01G 9/24; A01G 9/241; A01G 9/243; A01G 9/247; A01G 9/249; A01G 25/02; A01G 31/06

USPC ................................. 47/60, 79, 83, 47, 48.5
See application file for complete search history.

(56) References Cited

U.S. PATENT DOCUMENTS

| | | | |
|---|---|---|---|
| 1,282,369 A | 10/1918 | Belcher | |
| 1,954,674 A | 4/1934 | Lager | |
| 2,940,218 A | 6/1960 | Carter | |
| 3,106,801 A | 10/1963 | Risacher | |
| 3,314,192 A | 4/1967 | Park | |
| 3,506,138 A * | 4/1970 | Travis | A47B 55/02 108/91 |
| 3,664,274 A | 5/1972 | Bustos | |
| 3,677,615 A | 7/1972 | Hudson | |
| 3,686,792 A * | 8/1972 | Barfield | A01G 9/247 47/39 |
| 3,841,023 A | 10/1974 | Carlyon, Jr. | |
| 3,955,863 A | 5/1976 | Yellin | |
| 3,964,810 A | 6/1976 | Murphy | |
| 4,045,911 A | 9/1977 | Ware | |
| 4,198,953 A | 4/1980 | Power | |

(Continued)

*Primary Examiner* — William V Gilbert

(57) ABSTRACT

The present invention comprises a multilevel structure made up of several components that fit together to form a rectangular frame that can be combined with other such multilevel frame structures to form a desired size of greenhouse that can either be free standing, attached to the wall/fence or pegged to the ground. Additionally, the greenhouse offers a light intensity controller in the form of an externally provided or directly attached refractor/reflecting/magnifying lens/that can increase, reduce or change the amount of light. Furthermore, the greenhouse has the ability to run water tubing and electrical wires through its frame structure that allows humidity control, lighting and heating of the environment within, for hydroponic, aeroponic and conventional earth farming.

12 Claims, 10 Drawing Sheets

(56) References Cited

U.S. PATENT DOCUMENTS

| | | | |
|---|---|---|---|
| 4,621,740 A | 11/1986 | Lang | |
| 4,760,666 A | 8/1988 | Han | |
| 4,914,858 A * | 4/1990 | Nijssen | A01G 7/045 47/1.01 R |
| 5,722,544 A | 3/1998 | Williams | |
| 6,202,867 B1 | 3/2001 | Di Blasi et al. | |
| 6,474,838 B2 | 11/2002 | Fang et al. | |
| 6,536,157 B2 | 3/2003 | Wijbenga | |
| 6,578,720 B1 | 6/2003 | Wang | |
| 6,720,040 B2 | 4/2004 | Chen | |
| 7,823,324 B2 | 11/2010 | Townsley | |
| 8,016,140 B2 | 9/2011 | Hsieh | |
| 8,156,685 B2 | 4/2012 | Kleinwaechter | |
| 8,181,387 B2 | 5/2012 | Loebl et al. | |
| 8,468,741 B2 | 6/2013 | Lewis | |
| 8,522,987 B2 | 9/2013 | Lim | |
| 9,310,540 B2 | 4/2016 | Boonekamp et al. | |
| 9,345,207 B2 * | 5/2016 | Juncal | A01G 31/02 |
| 2008/0302746 A1 | 12/2008 | Scholz | |
| 2012/0111954 A1 | 5/2012 | Kim et al. | |
| 2013/0006401 A1 | 1/2013 | Shan | |
| 2013/0255146 A1 * | 10/2013 | Lehman | A01G 31/00 47/17 |
| 2014/0053463 A1 * | 2/2014 | Khaled | A01G 31/06 47/61 |
| 2015/0027048 A1 * | 1/2015 | Fok | A01G 31/00 47/66.7 |
| 2015/0107154 A1 | 4/2015 | Visser | |
| 2016/0212945 A1 * | 7/2016 | Colless | A01G 9/1423 |
| 2016/0338276 A1 * | 11/2016 | Speidell | A01G 31/06 |
| 2016/0345518 A1 * | 12/2016 | Collier | A01G 9/143 |
| 2017/0339846 A1 * | 11/2017 | Lawrence | A01G 31/06 |

\* cited by examiner

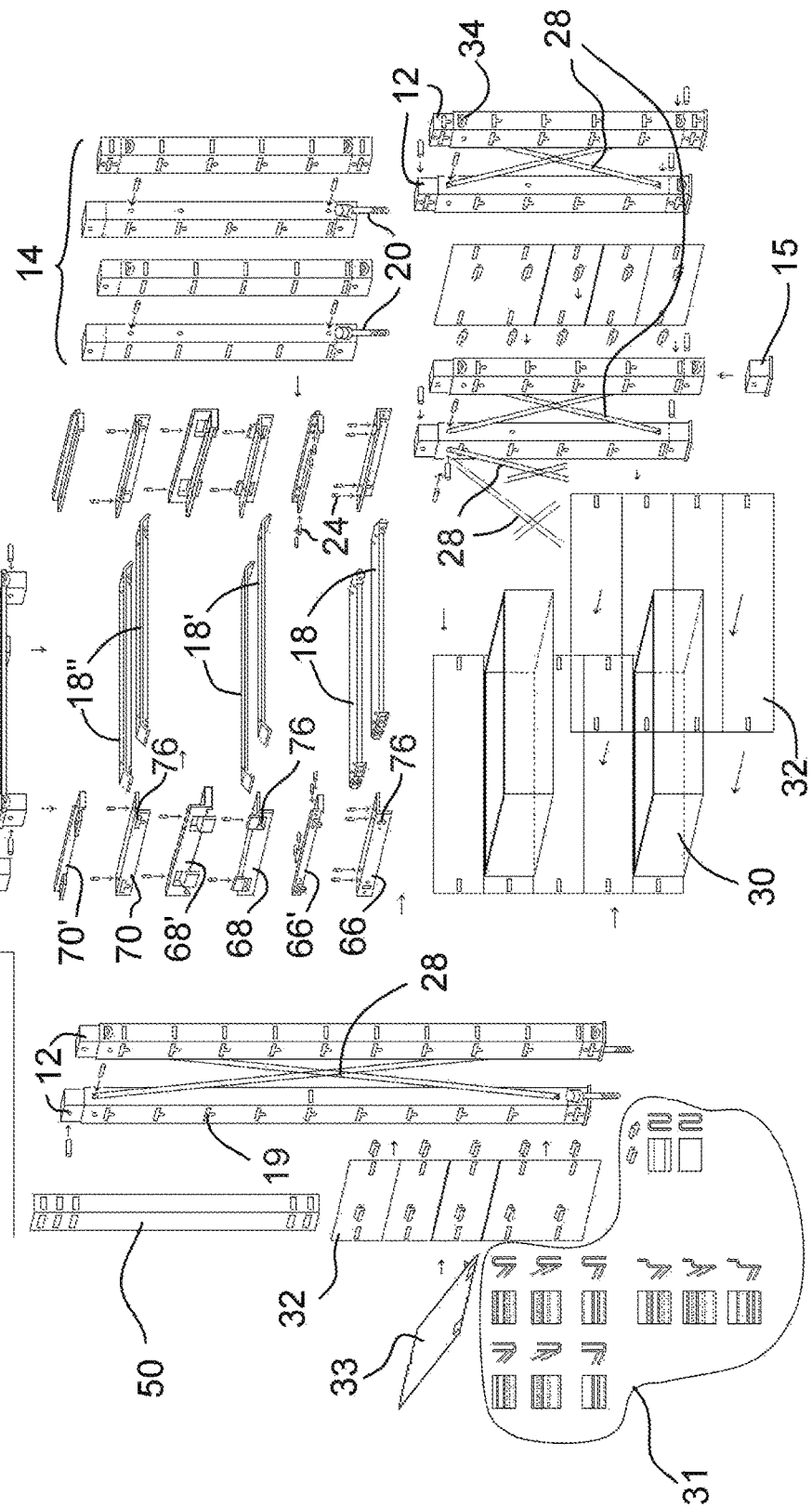

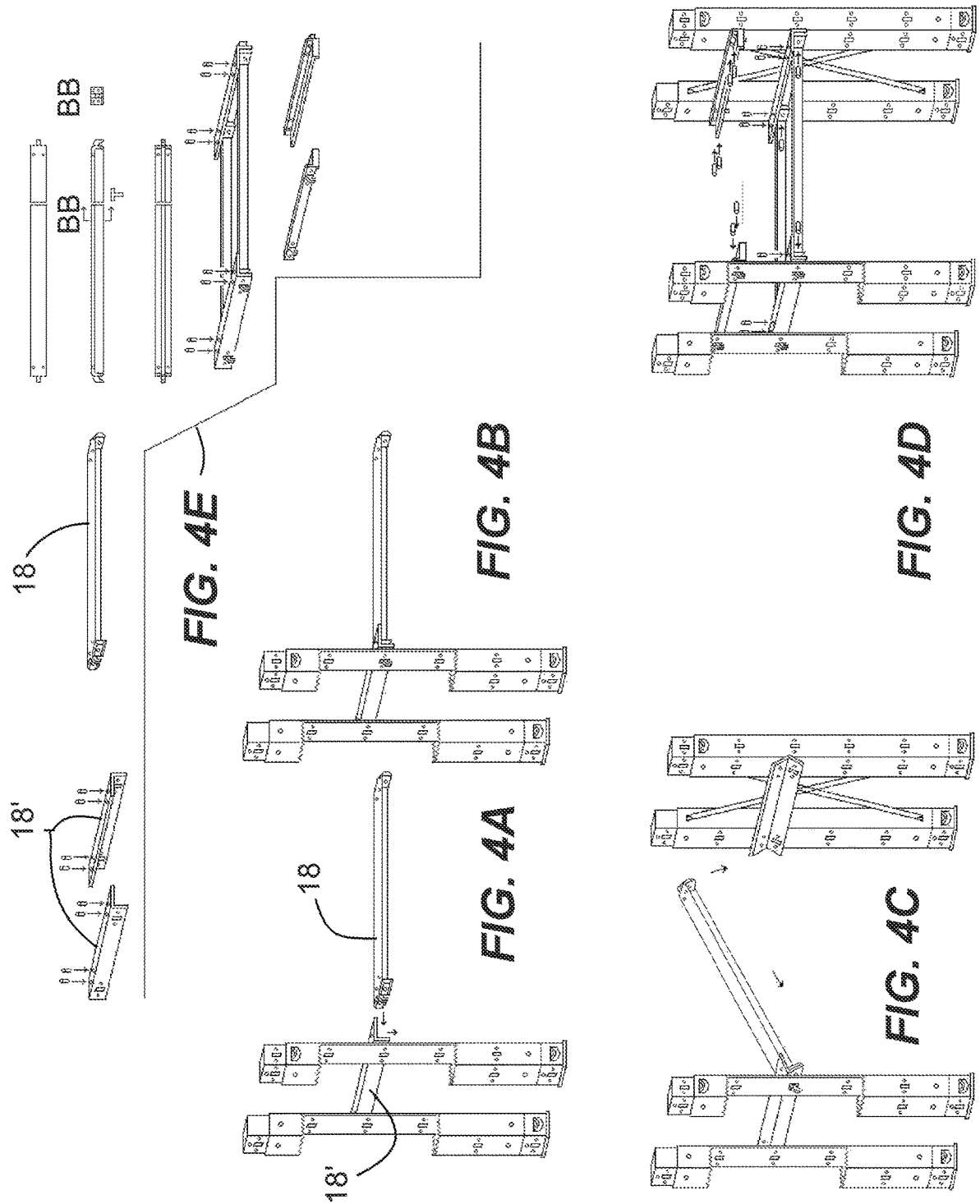

MODULAR, MOVABLE, VERSATILE, VERTICAL GREENHOUSE

CROSS-REFERENCE TO RELATED APPLICATIONS

The present application claims priority to United Kingdom Patent Application serial number GB1715204.2, filed on Sep. 20, 2017 entitled "A MODULAR, MOVABLE, VERSATILE, VERTICAL GREENHOUSE", the disclosure of which is hereby incorporated in its entirety at least by reference.

BACKGROUND OF THE INVENTION

1. Field of the Invention

The invention relates generally to a greenhouse but more particularly to a modular, movable, versatile, vertical greenhouse

2. Description of Related Art

With increasing awareness in raising one's own plants for a variety of reasons, besides farmers, gardeners and enthusiasts, individuals, schools, companies, and establishments are also growing their own produce. Due to varying needs and space restrictions, traditional greenhouses cannot always be accommodated in small homes, classrooms, apartments and closed spaces. Portable greenhouses allow the growth of plants in small spaces however, light, humidity and temperature are difficult to control for the plants that grown within. Consequently, there is a need for a greenhouse that can be assembled quickly with ease and that satisfies basic and variable growth requirements of sunlight, warmth, humidity and nutrition.

BRIEF SUMMARY OF THE INVENTION

In one embodiment, a modular greenhouse is equipped with electrical wiring for various lighting and heating needs along with piping for supporting hydroponics, aeroponics and earth farming. Additionally, the greenhouse may be powered by a solar panel or directly via a power outlet. In one embodiment, the lighting, temperature, and humidity ratios of the greenhouse are individually controllable and/or automated using a system of sensors, motors, measuring devices and controllers.

In one embodiment, the modular greenhouse is comprised of prefabricated components in the form of lightweight columns with male and female ends that can be inserted into one another to form the outer support frame. In one embodiment the columns fit into a support base frame that holds the structure together along with horizontal support bars, whereas in an alternate embodiment, the columns comprise the legs of the frame and diagonal cross bars and horizontal support bars forming a frame are used to ensure stability.

The present invention comprises a multilevel structure made up of several components that fit together to form a rectangular frame that can be combined with other such multilevel frame structures to form a desired size of greenhouse that can either be free standing, attached to the wall/fence or pegged to the ground. Additionally, the greenhouse offers a light intensity controller in the form of an externally provided or directly attached refractor/reflecting/ magnifying lens/that can increase, reduce or change the amount of light.

Furthermore, the greenhouse has the ability to run water tubing and electrical wires through its frame structure that allows humidity control, lighting and heating of the environment within, for hydroponic, aeroponic and conventional earth farming.

The greenhouse can be made of a variety of materials and colors with suitable covers that fit over the frame structure to filter specific light. The controls for humidity, light, temperature and watering can be operated individually or collectively, either manually or remotely, and/or pre-set using a system of sensors, electrical and/or mechanical motors, measuring devices, and a central control unit.

BRIEF DESCRIPTION OF THE SEVERAL VIEWS OF THE DRAWINGS

Other features and advantages of the present invention will become apparent when the following detailed description is read in conjunction with the accompanying drawings, in which:

FIG. 1A illustrates components of the vertical greenhouse according to an embodiment of the present invention.

FIG. 1B illustrates front view of the fan, heating element, and side panels with insulation material, according to an embodiment of the present invention.

FIGS. 4A-D illustrates isometric views showing the steps in installing the transverse horizontal support bars and the lateral support bars according to an embodiment of the present invention.

FIG. 4E illustrates isometric views of the transverse horizontal support bars and the lateral support bars of FIGS. 4A-D.

DETAILED DESCRIPTION OF THE PREFERRED EMBODIMENT

Figure 2E:
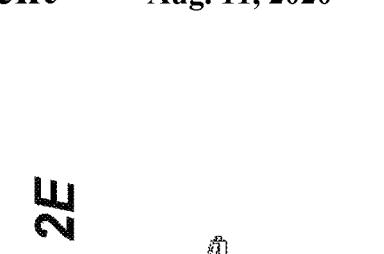
FIGS. 2E-F are isometric views of the lateral support bars and front views along AA to show the knob and nipple system to lock the lateral support bars according to an embodiment of the present invention.
Figure 2F:
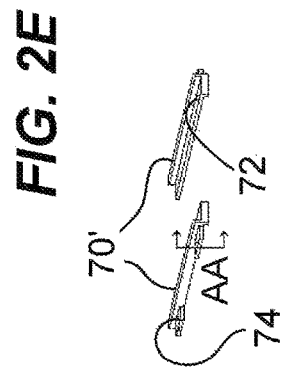
Figure 2G:
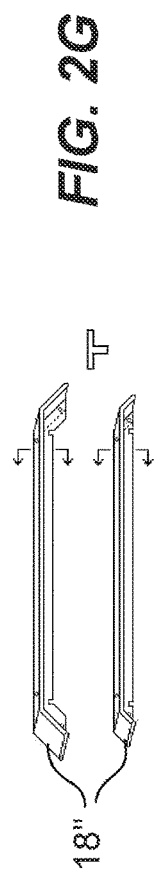
FIG. 2G are isometric views of an embodiment of the transverse bars.
Figure 2B:
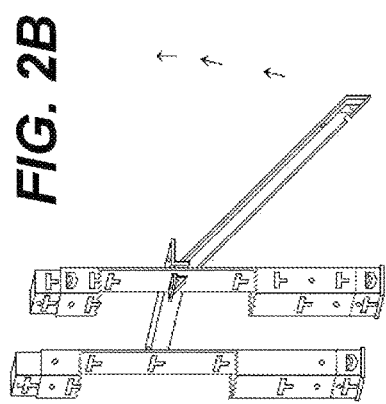
FIGS. 2A-D are isometric views showing steps in installing the transverse horizontal support bars and the lateral support bars according to an embodiment of the present invention.

The following description is provided to enable any person skilled in the art to make and use the invention and sets forth the best modes contemplated by the inventor of carrying out their invention. Various modifications, however, will remain readily apparent to those skilled in the art, since the general principles of the present invention have been defined herein to specifically provide a modular, movable, versatile, vertical greenhouse.

Referring now to any of the accompanying FIGS. 1-10, a modular, movable, versatile, vertical greenhouse 10 is provided. The greenhouse comprises different sizes and heights of lightweight male-female connection columns 12 and female-female connection columns 14. In one embodiment, the columns fit into one another and are held together using a base support 16. The base support is used every few columns vertically to hold the greenhouse together. In one embodiment, diagonal cross bars 28 are provided to further stabilize the green house. In one embodiment, feet 15 are positioned in the bottom of the columns to help stabilize the greenhouse on the installation surface. The greenhouse is configured to be built in many levels and combined with other tiers to build a modular, movable, versatile, vertical greenhouse of a desired size.

In one embodiment, containers 30 are provided, wherein the containers are configured to contain plants, soil, water, and/or or pots 35, i.e. the components necessary for growing vegetables, fruits, herbs, etc. In one embodiment, the containers 30 provided are available in various sizes to accommodate varying component sizes. In one embodiment, each container may have one or more light 31 and a light refracting/reflecting, or magnifying lens 33, wherein the light refracting/reflecting, or magnifying lens is positioned underneath or on top of the container depending on the container's position.

Figure 2D:
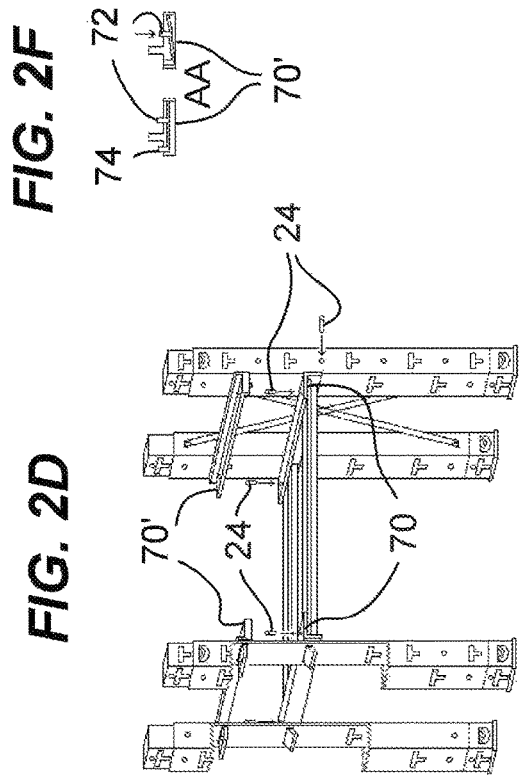
Figure 2A:
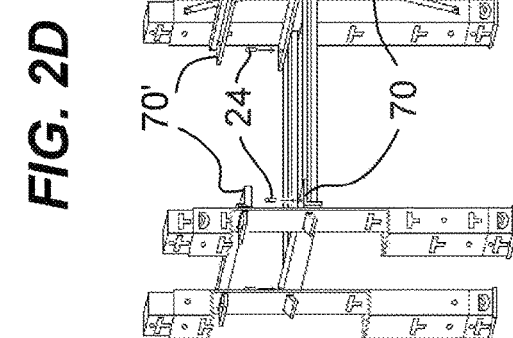
Figure 2C:
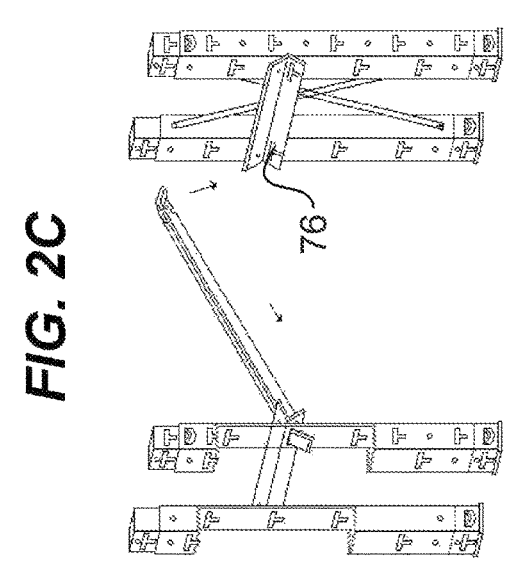
Figure 3A:
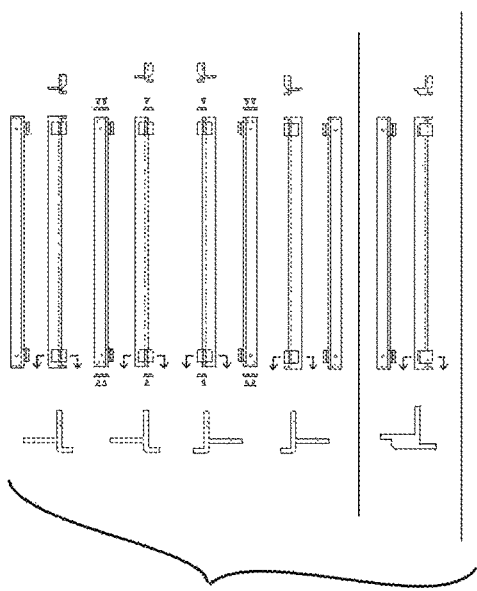
FIG. 3A illustrates Isometric views of the transverse horizontal support bars and the lateral support bars according to an embodiment of the present invention.
Figure 3B:
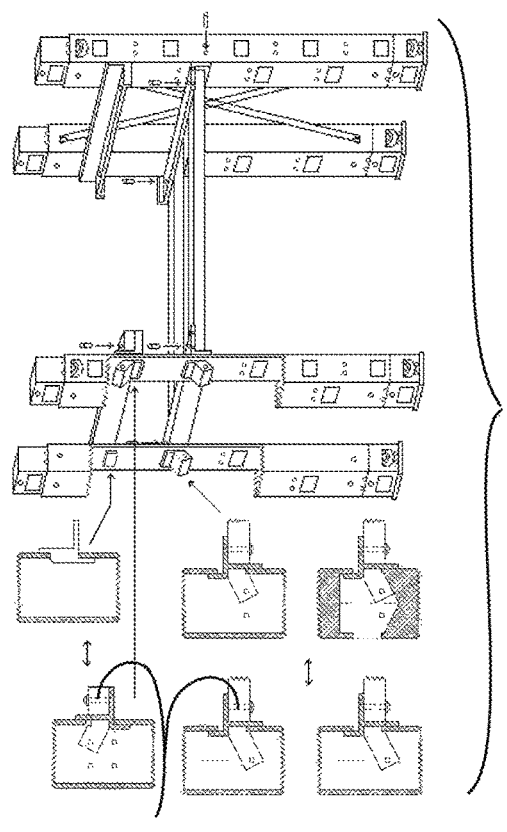
FIG. 3B illustrates top, side, bottom and end views of alternative embodiments of the horizontal support bars.
Figure 3C:
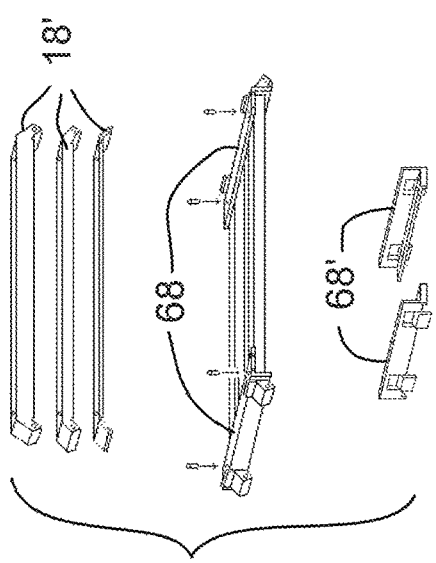
FIG. 3C illustrates an isometric view of the assembly of the embodiment of FIG. 3A.
Figure 3D:
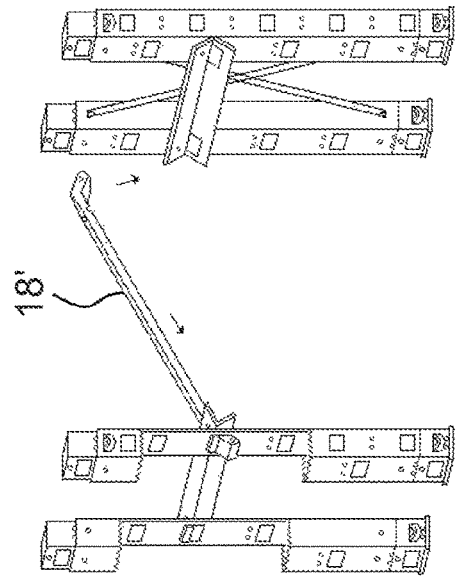
FIG. 3D illustrates side cutaway views of the column showing horizontal bar ends alternative embodiments along with an isometric view of a greenhouse unit with columns partially cut out to see the interior according to an embodiment of the present invention.
Figure 5:
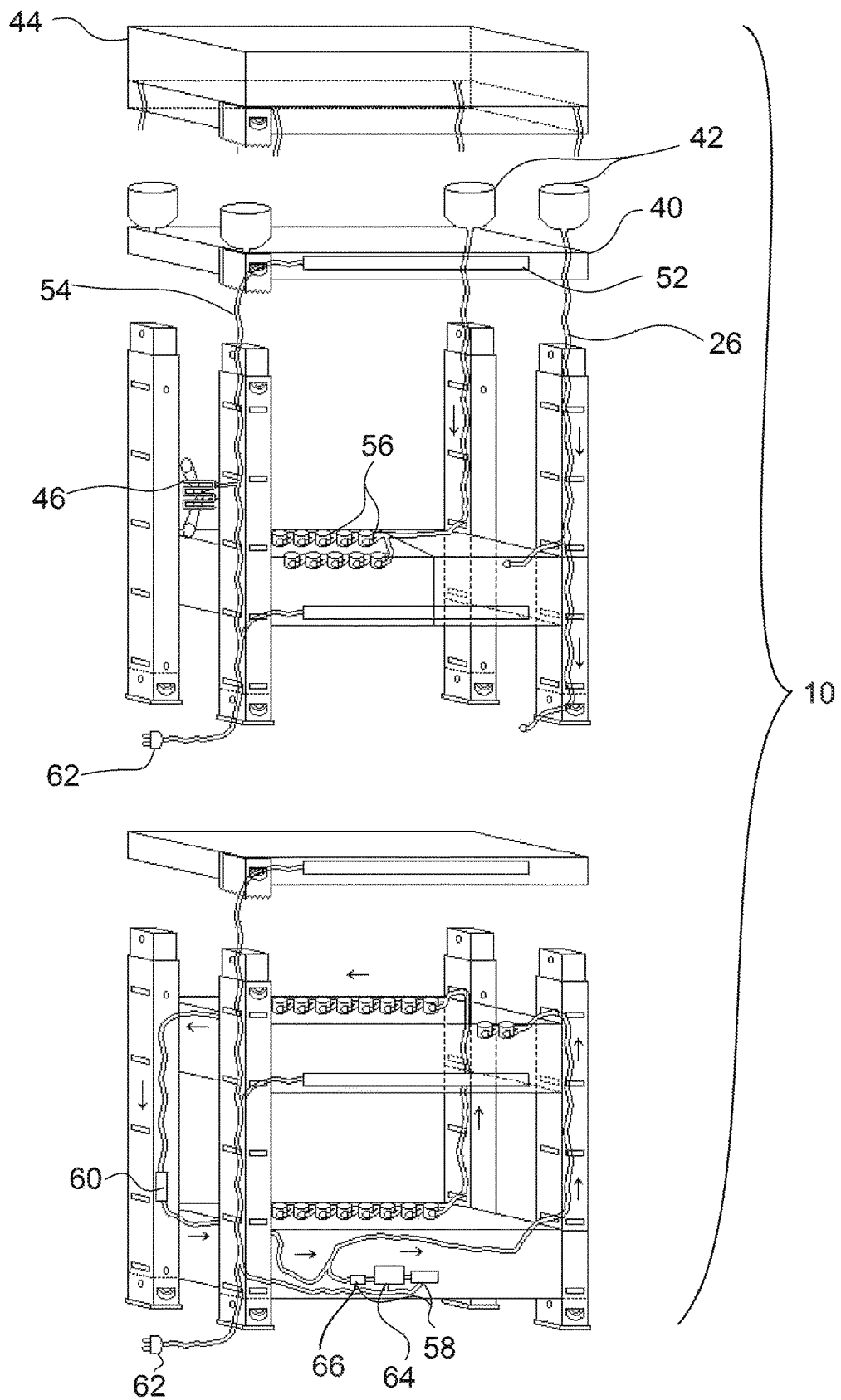
FIG. 5 illustrates an exploded view of a movable, versatile, modular greenhouse according to an embodiment of the present invention.
Figure 6:
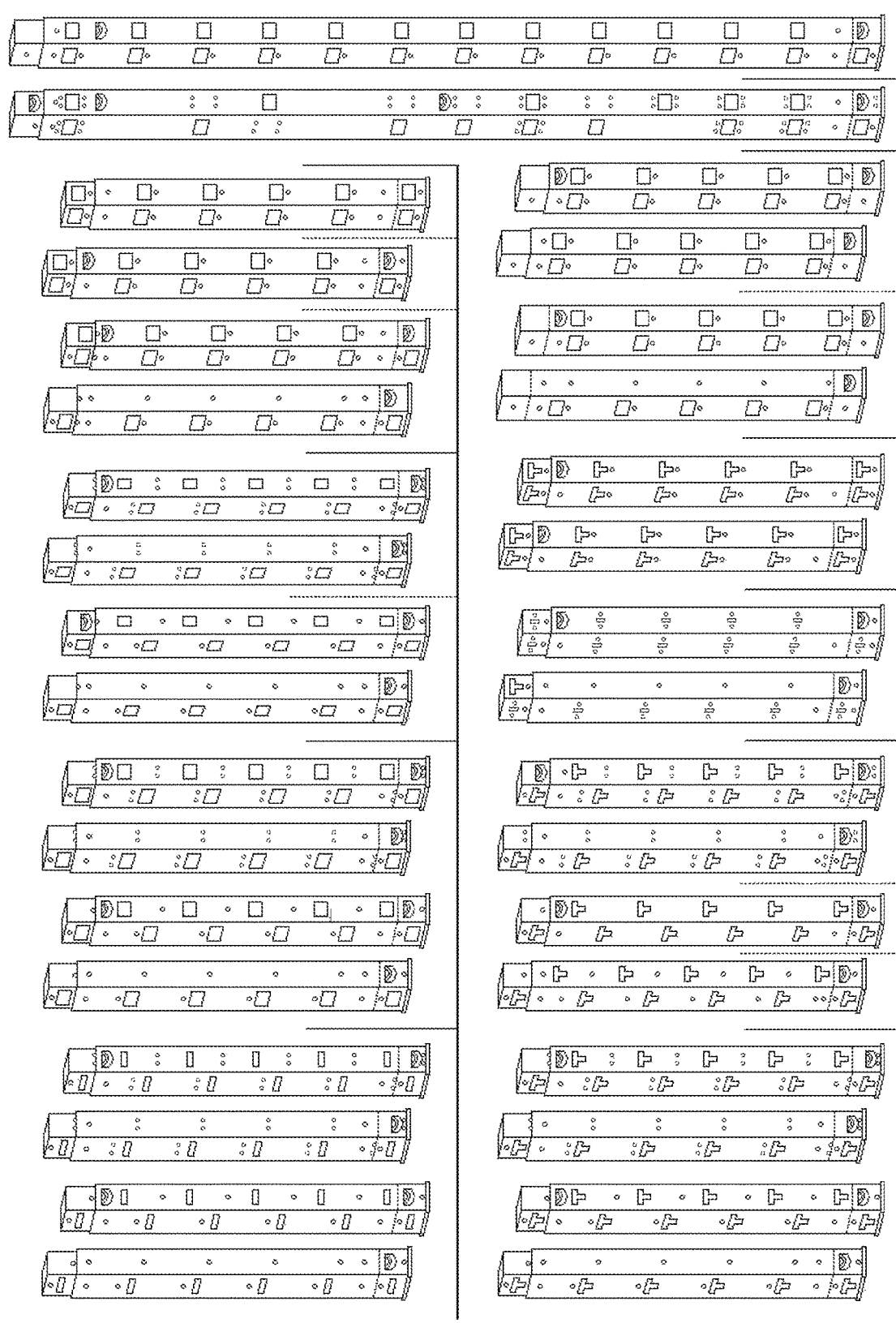
FIG. 6 illustrates isometric views of different columns for the various embodiments.
Figure 7:
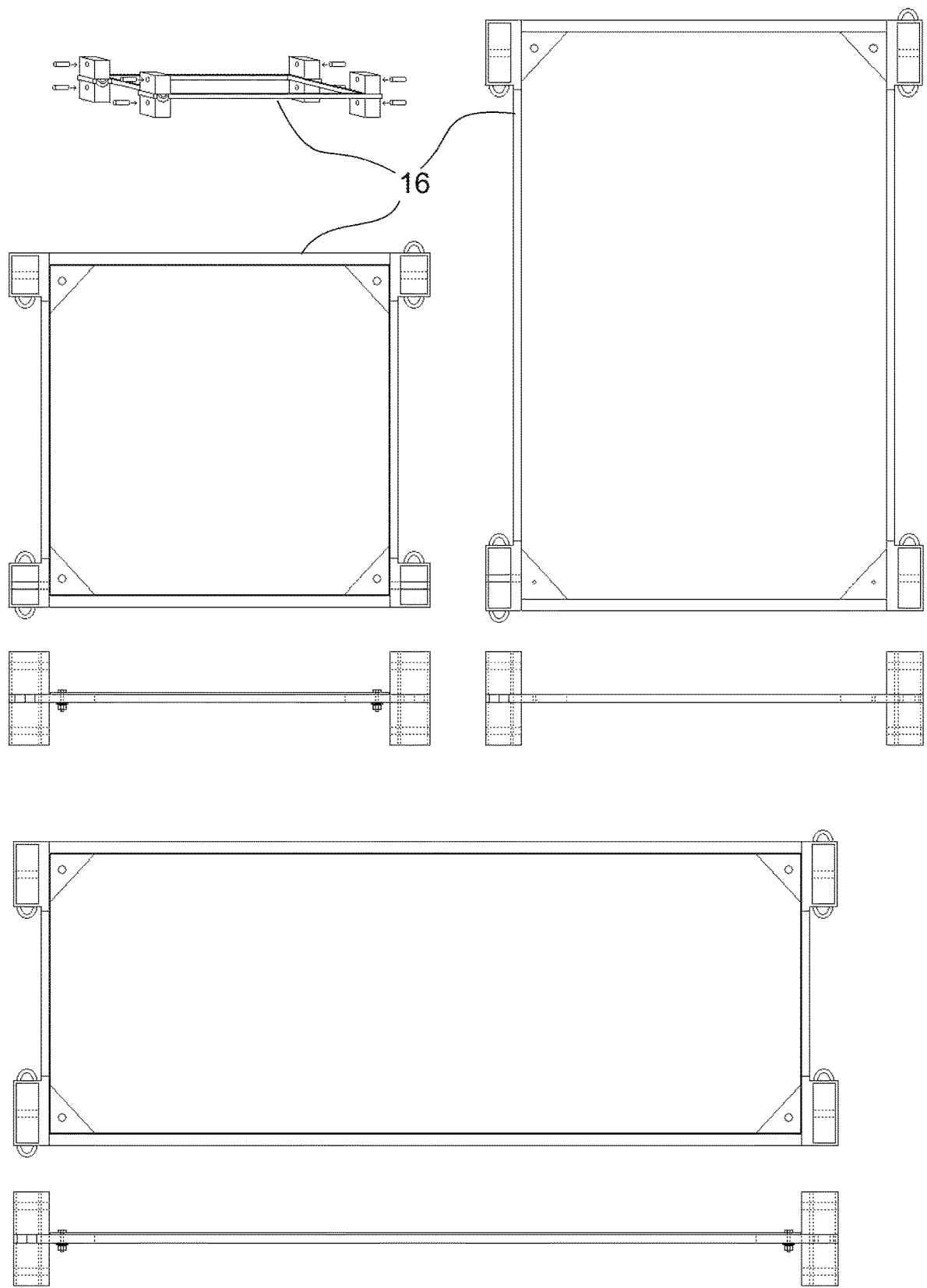
FIG. 7 illustrates isometric, top, and side views of various sized support base frames according to embodiments of the present invention.
Figure 8:
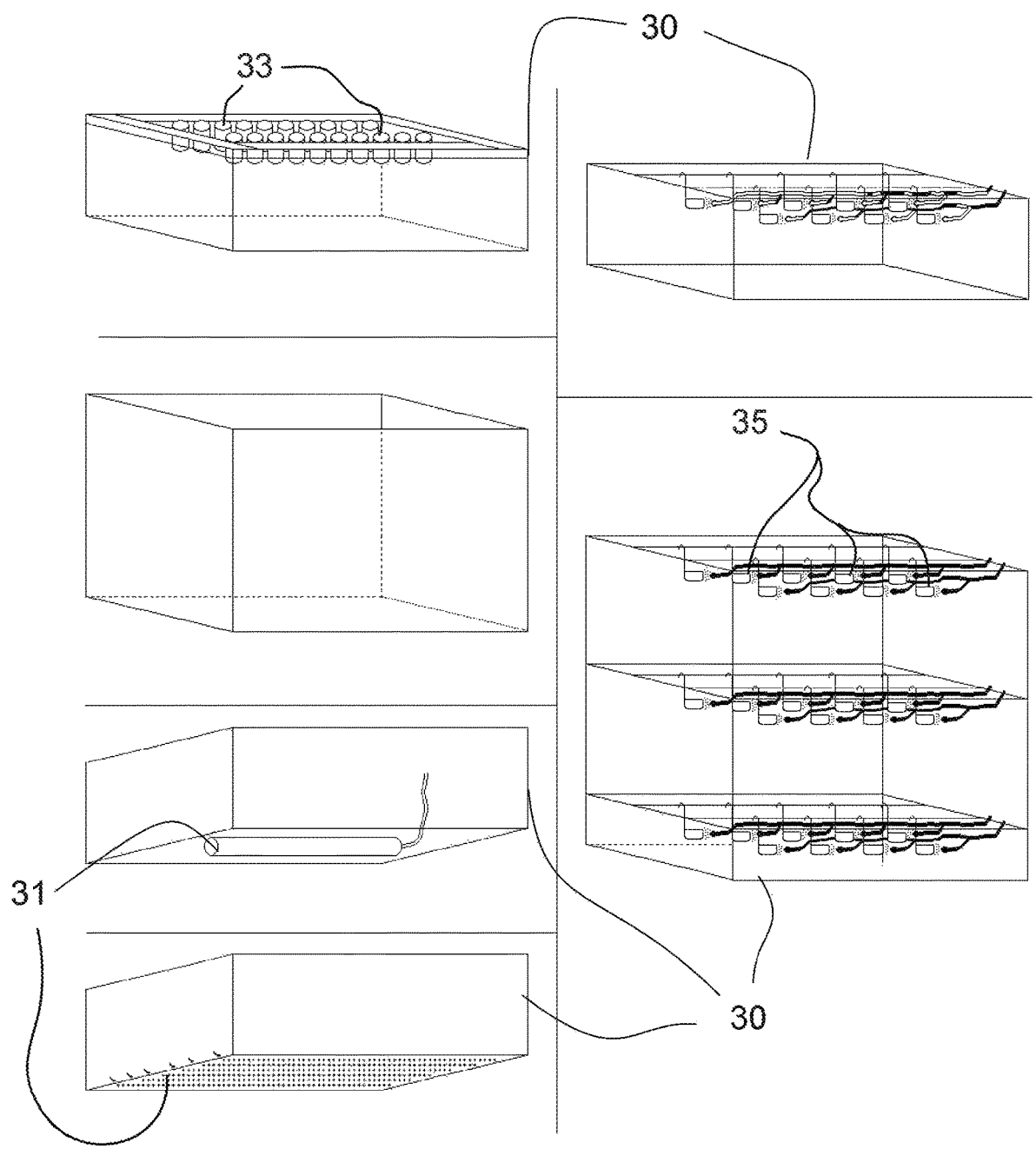
FIG. 8 illustrates isometric views of irrigation, heating and lighting systems along with the containers according to embodiments of the present invention.
Figure 9:
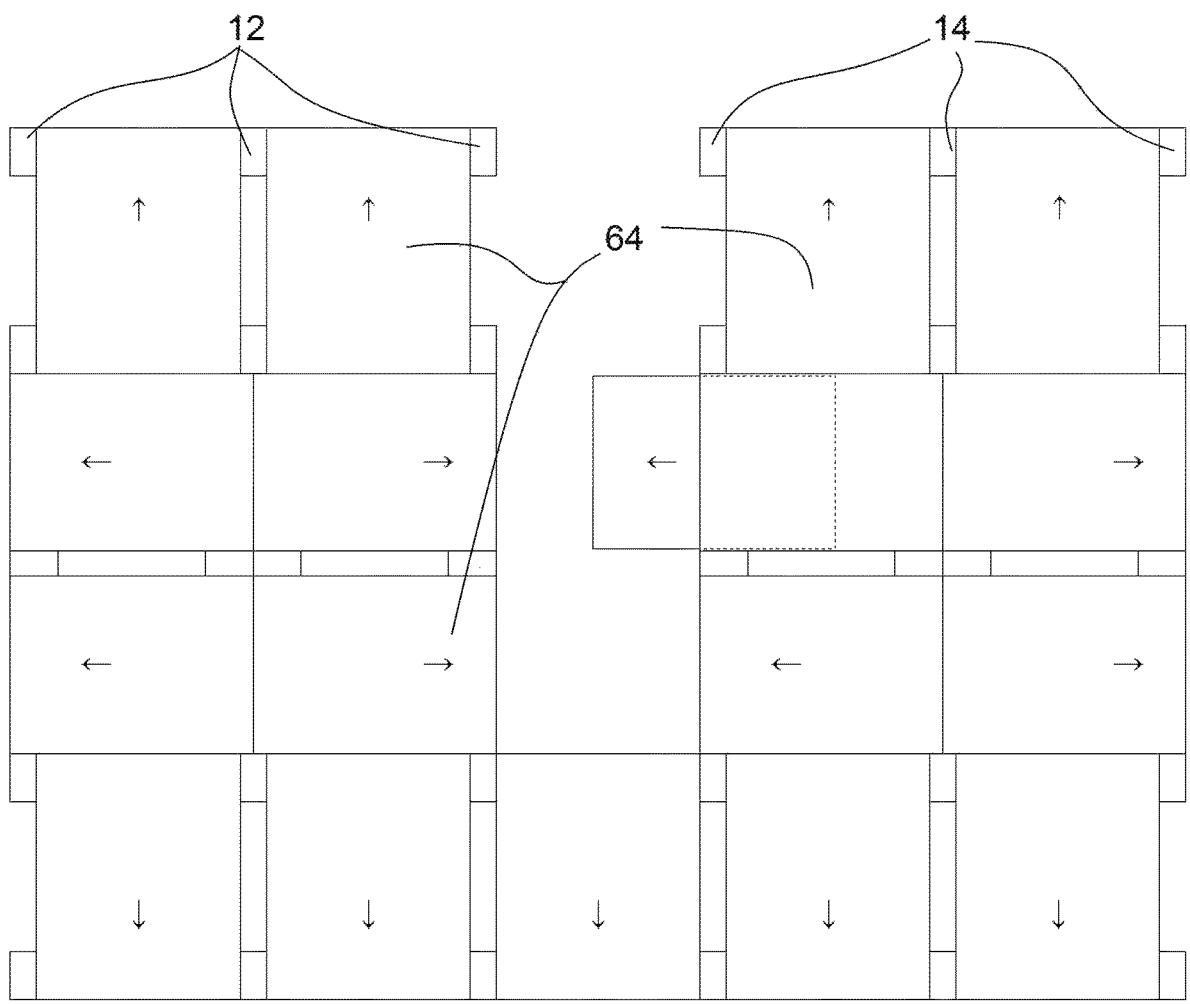
FIG. 9 illustrates a top view of the greenhouse using 32 columns to form 17 units according to an embodiment of the present invention.
Figure 10:
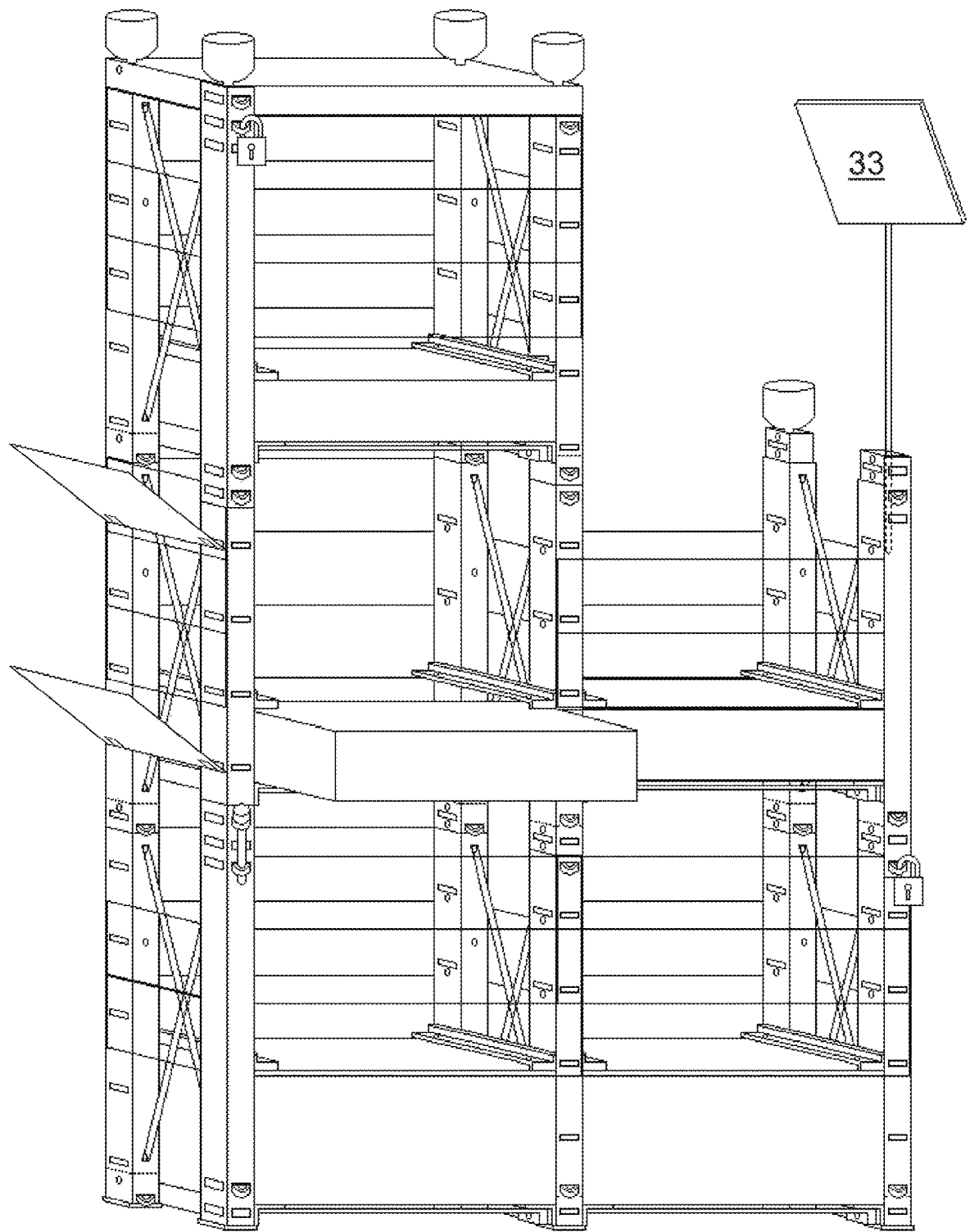
FIG. 10 is an isometric view of the greenhouse using two tiers joined together according to an embodiment of the present invention.

In one embodiment, transverse bars 18/18'/18" and their complimentary lateral bars 66/66'/68/68'/70/70' are used as supports for the containers 30 and can also be used to hold the structure together therefore avoiding the use of the base support if so desired. Best seen in FIGS. 2A-D, the end portion of a transverse bar, for instance, transverse bar 18" is inserted through opening 76 on lateral bar 70, and then passed through column opening 19 positioned on column 12. In FIG. 2D, the column is cut away showing the inside of the column and how the transverse bar is inserted and positioned when installed. Next, after the first end of the transverse bar is connected, the second end is connected in a similar fashion to the opposite side of the greenhouse. This process is repeated until completion of the desired arrangement of the greenhouse structure. In one embodiment, pins 24 are provided for a fastening means when the transverse bars and lateral bars are fastened to the columns. In alternative embodiments, screws and bolts can serve as fasteners. It should be noted that lateral bars 68 and 68' are the same but flipped upside down. In essence, each set of lateral bars 66, 66', 68, 68', 70, 70' works in pairs to support the container from below and to secure the container 30 from the top.

It is a particular advantage of the present invention, to provide a locking mechanism 72 configured to lock in the horizontal transverse support bars to the lateral support bars. In one embodiment, the locking mechanism is a depressible knob configured to lower a nipple 74 positioned on the interior wall of the column such that the lateral bars are locked in position against the columns.

In one embodiment, a top cover is provided, wherein the top cover is configured to be positioned on the top of the greenhouse structure. The top cover is preferably constructed of a refracting, reflecting, or magnifying material configured to filter and let in a desired amount of light, as well known in the art. In alternative embodiments, the top cover, or a portion of the top cover may include a solar sheet, to generate electricity as well known in the art. In yet another embodiment, the top cover, or a portion of the top cover may include an insect screen. Likewise, in one embodiment, side panels 32 are constructed of an insulating, refracting, reflecting, or magnifying material configured to filter and let in a desired amount of light. The side panels may also include solar sheets, and insect screens as well. In one embodiment, the side panels are attached to the greenhouse structure via clips 31. A light refracting, reflecting, magnifying material or solar panel 33 may be positioned suitably on the greenhouse structure to direct, deflect, filter, magnify the light from an external or internal light source (not shown) or generate electricity.

In one embodiment, cups 42 are inserted into the covers of the top over or directly onto the columns. Piping tubes 26 are attached to the cups and positioned along the columns, wherein the piping tubes are configured to carry fluid to the various levels of the greenhouse structure. The cups can be provided water or other fluids, e.g. nutrients, through various means which will be discussed later, wherein the water or fluid is transferred to the piping tubes for irrigation purposes. In some embodiments, for more precise delivery of water or fluids, such as for hydroponics or aeroponics 56, a filter 60 having nozzles (not shown), a pump 64, a valve 66, timer, and central control unit are provided.

In one embodiment, a rainwater collection container configured to harvest rainwater may be affixed to the top cover. In one embodiment, a heating fan and element 46 and a light source 52 provided on the greenhouse structure are configured to draw current via electrical wiring 54 drawn through the columns from an alternative energy source or directly via an outlet using a power plug 62 as well known in the art. Advantageously, the moisture, heating, lighting, and irrigation may be controlled either manually or automatically using a central control unit 58. In some embodiments, sensors and other measuring devices are configured to monitor various conditions in which the central control unit may control, not limiting to temperature, humidity, and lighting.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A modular greenhouse comprising:
   a vertical rectangular section having four column assemblies, each column assembly including at least one male-female column and at least one female-female column, wherein the at least one male-female column and at least one female-female are configured to fit together defining a height of the vertical rectangular section;
   at least one base support configured to hold the vertical rectangular section together, the at least one base support defining the vertical rectangular section shape;
   a plurality of transverse bars and a plurality of lateral bars positioned horizontally at various heights of the vertical rectangular section, the plurality of transverse and lateral bars configured to support a number of growing containers;
   an irrigation system including irrigation tubes along the column assemblies configured to deliver fluid to the number of growing containers;
   a top cover positioned on the vertical rectangular section, wherein the top cover is configured to control the amount and intensity of sunlight from reaching the number of growing containers; and,
   a plurality of side panels configured to control the amount and intensity of sunlight torn reaching the number of growing containers;
   the irrigation system includes a number of cups configured to be inserted into corners of the top cover or directly into each column assembly, wherein the cups are in fluid connectivity with the irrigation tubes.

2. The modular greenhouse of claim 1, further comprising diagonal cross bars configured to stabilize the vertical rectangular section.

3. The modular greenhouse of claim 1, further comprising at least one additional vertical rectangular section.

4. The modular greenhouse of claim 3, wherein the at least one additional vertical rectangular section includes at least two additional column assemblies configured to connect to two column assemblies of the four column assemblies of the vertical rectangular section.

5. The modular greenhouse of claim 4, wherein the at least one additional vertical rectangular section includes a second at least one base support defining the at least one additional vertical section shape.

6. The modular greenhouse of claim 1, further comprising a solar sheet or solar panel positioned or in conjunction with the top cover and/or the plurality of side panels.

7. The modular greenhouse of claim 1, further comprising a heating fan and a light source.

8. The modular greenhouse of claim 7, further comprising a central control unit configured to control the heating fan, the light source, and the irrigation system.

9. The modular greenhouse of claim 1, wherein the number of growing containers are configured to contain plants in a growing method selected from the group consisting of soil, hydroponic, and aeroponic.

10. The modular greenhouse of claim 9, further comprising light refracting/reflecting materials and/or a magnifying lens underneath or on top of the number of growing containers.

11. The modular greenhouse of claim 1, wherein each column assembly includes a plurality of openings and the plurality of lateral bars each includes a pair of openings, wherein an end portion of each transverse bar of the plurality of transverse bars is configured to pass through a first opening of the pair of openings and a second opening of the plurality of openings securing the respective transverse bar in position.

12. The modular greenhouse of claim 11, wherein each transverse bar of the plurality of transverse bars are locked to a corresponding lateral bar of the plurality of lateral bars via a locking mechanism.

* * * * *